United States Patent [19]

Martin

[11] 4,251,432
[45] Feb. 17, 1981

[54] METHOD OF PROVIDING CURABLE FLUOROELASTOMER GUMS HAVING COUPLING AGENT COATED PARTICULATE CARBONACEOUS FILLERS

[75] Inventor: Jon W. Martin, Los Alamitos, Calif.

[73] Assignee: TRW Inc., Redondo Beach, Calif.

[21] Appl. No.: 883,760

[22] Filed: Mar. 6, 1978

[51] Int. Cl.³ .......................... C08K 9/04; C08K 9/10
[52] U.S. Cl. ........................... 260/42.14; 260/42.27; 260/42.32; 260/42.47; 260/42.49; 260/42.56; 428/407; 525/199; 525/200
[58] Field of Search ............... 260/42.14, 42.56, 42.34, 260/42.49, 890, 42.27; 428/407

[56] References Cited
U.S. PATENT DOCUMENTS

| 2,879,173 | 3/1959  | Yacoe ............................ 428/407 X |
| 2,906,740 | 9/1959  | Becker et al. .................. 428/407 X |
| 3,340,222 | 9/1967  | Fang ............................ 260/42.14 X |
| 3,431,235 | 3/1969  | Lubowitz ........................ 526/47 X |
| 3,519,703 | 7/1970  | Merkl et al. .................. 260/890 X |
| 3,755,231 | 8/1973  | Muir et al. .................... 260/42.34 X |
| 3,759,868 | 9/1973  | Meyers et al. ................. 260/890 X |
| 3,853,809 | 12/1974 | Martin et al. .................. 260/890 X |
| 3,881,536 | 5/1975  | Doran et al. .................. 260/42.49 X |
| 3,930,107 | 12/1975 | Yaeda et al. .................... 428/407 |
| 3,971,753 | 7/1976  | Frechtling et al. ........... 260/42.56 X |

Primary Examiner—Wilbert J. Briggs, Sr.
Attorney, Agent, or Firm—Christie, Parker & Hale

[57] ABSTRACT

Elastomer compositions comprising an elastomer gum curable to the solid, elastomeric state in the presence of an organic peroxide free radical initiator, a solid particulate filler, a hydrocarbon resin having a plurality of pendant vinyl groups per molecule, and an organic peroxide curative are described. Vulcanizates of such compositions are also described. Preferred are elastomer compositions comprising a fluoroelastomer gum curable to the solid, elastomeric state in the presence of an organic peroxide cure initiator and a carbonaceous filler coated with a 1,2-polybutadiene resin. Solid particulate fillers coated with a hydrocarbon resin having a plurality of pendant vinyl groups per molecule, such as 1,2-polybutadiene, are also described.

8 Claims, No Drawings

METHOD OF PROVIDING CURABLE FLUOROELASTOMER GUMS HAVING COUPLING AGENT COATED PARTICULATE CARBONACEOUS FILLERS The Government has rights in this invention pursuant to Contract (or Grant) No. F-33615-76-C-5086 awarded by the Department of the Air Force.

BACKGROUND

This invention relates to a method of providing elastomer compositions including a peroxide curable elastomer gum, notably a fluoroelastomer gum, a solid particulate filler, and a coupling agent for strengthening the bond between the polymer and the filler upon curing.

Fillers for elastomers are of two general types, reinforcing and non-reinforcing. A non-reinforcing filler increases the bulk of an elastomer and may cause a decrease in properties such as modulus and tear strength. Reinforcing fillers such as carbon black, silicas, metal oxides, and the like improve properties of elastomers in which they are incorporated, thus providing elastomers having more desirable characteristics than corresponding unfilled elastomers. The use of a suitable coupling agent can improve the efficacy of such reinforcing fillers, providing elastomers with improved mechanical strength at elevated temperatures, better resistance to solvent swelling, and greater resistance to failure at the filler/polymer interfaces.

The concept of employing a coupling agent to improve bonding between a solid, particulate filler and the cured matrix of an elastomer has been described. An example of the use of coupling agents is the treatment of finely divided silica with a difunctional silane having at least one functional group reactive with silanol groups on the silica and at least one functional group such as a mercapto group, reactive with the elastomer matrix in which the filler is incorporated. Many sizes and coatings have been developed to improve bonding between rubber and plastic, steel, or fiber-glass filaments, strands, cloth, and the like.

Fluorinated elastomers are becoming increasingly important in applications requiring resistance to fuel, oil, and hydraulic fluids, low compression set, and retention of flexibility upon exposure to higher temperatures. They were first used in aircraft seals and have come into use in the chemical, petrochemical, and automotive industries. Fluoroelastomers have excellent resistance to hot oils, synthetic lubricants, gasoline, jet fuels, dry cleaning solvents and other organic solvents. Certain formulations are resistant to hot mineral acids, steam, hot water, certain alkalis, and a number of organic acids. They burn in a direct flame but otherwise have low flammability.

Fluoroelastomers can be injection molded, transfer molded, compression molded, or extruded to form such articles as O-rings, molded packings, oil seals, tubing, hose gaskets, mechanical goods, and rubber rolls.

It has been known to employ a variety of carbonaceous and inorganic reinforcing fillers in fluoroelastomers, including carbon black, finely ground coal, silica, iron oxide, zinc sulfide, calcium carbonate, and barium sulfate. Such fillers provide cured fluoroelastomers having improved mechanical properties such as tensile strength, tear strength, compression set, and the like. Further improvement through the use of a coupling agent has not thus far been described.

SUMMARY

In accordance with the present invention, it has been found that hydrocarbon resins having a plurality of pendant vinyl groups per molecule can be combined with an elastomer gum curable to the solid, elastomeric state in the presence of an organic peroxide cure initiator, a solid particulate carbonaceous filler, and an organic peroxide free radical initiator to provide a curable composition having desirable properties. In an embodiment of the invention, a curable composition including a peroxide curable fluoroelastomer gum, a 1,2-polybutadiene resin, a solid particulate filler, and an organic peroxide free radical initiator is provided. In other embodiments of the invention, solid particulate fillers coated with a hydrocarbon resin having a plurality of pendant vinyl groups per molecule, and curable elastomer compositions including such fillers, are provided.

DETAILED DESCRIPTION

Coupling agents of the present invention are hydrocarbon resins having a plurality of pendant vinyl groups per molecule. By "hydrocarbon" is meant that the resin is composed predominantly of carbon and hydrogen and may include minor proportions of other elements, such as oxygen or nitrogen, in the form of functional groups, e.g., terminal functional groups, such as hydroxyl groups, carboxylic acid groups, amino groups, and ester groups. Other functional groups may also be present which do not interfere with the function of the coupling agent in strengthening bonding between the filler and the cured polymer matrix.

The coupling agents have sufficiently low volatility to be incorporated into an elastomer composition by ordinary rubber compounding techniques, such as roll milling or Banbury mixing, without excessive loss, and have sufficiently low viscosity at rubber compounding temperatures for incorporation into the elastomer composition. Such coupling agents may have an average molecular weight in the range of from about 300 to about 7000 or higher. The upper limit of molecular weight is determined by the viscosity of the coupling agent and the method employed in its use. Thus, when the coupling agent is incorporated directly into an elastomer composition by milling or Banbury mixing, a coupling agent having high or even gum-like viscosity can be used. When the coupling agent is first coated onto the filler, a liquid of relatively low viscosity is preferred. A high viscosity coupling agent can also be thinned with a suitable volatile solvent for coating onto the filler. Hydrocarbon resin coupling agents having an average molecular weight in the range of from about 1000 to 5000 have desirably low volatility and low viscosity at temperatures commonly employed in elastomer compounding.

Hydrocarbon resins useful as coupling agents in accordance with this invention have a carbon backbone and a plurality of pendant vinyl groups per molecule of coupling agent. Desirably, a substantial weight proportion of the coupling agent, for example at least about 10 weight percent, is in the form of pendant vinyl groups. The upper limit to the weight proportion of the coupling agent in pendant vinyl group form is set only by the structure of the polymer itself. For example, 1,2-polybutadiene can theoretically have up to 50 percent of its weight in pendant vinyl groups.

A preferred coupling agent in accordance with this invention is 1,2-polybutadiene, a resin characterized by the repeating unit

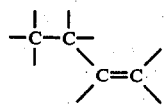

and having an extended carbon-carbon backbone with pendant vinyl groups on alternate carbons. The 1,2-polybutadiene may be prepared by anionic polymerization of 1,3-butadiene as described in U.S. Pat. No. 3,431,235, which is incorporated herein by reference. Such resins themselves are known and can be obtained commercially.

Briefly, the 1,2-isomeric form of polybutadiene may be prepared by anionic polymerization of 1,3-butadiene in the presence of an alkali metal such as lithium or sodium in a polar solvent such as tetrahydrofuran to produce a polymeric hydrocarbon terminated by the alkali metals. The polymerization can be carried out in a water and oxygen free atmosphere at temperatures of about −80° C. to −20° C. The terminal metal atoms can be replaced with hydrogen, hydroxyl groups, carboxylic acid groups, or the like to produce a predominantly hydrocarbon resin having pendant vinyl groups on alternate carbons.

In practice, the resulting polymer is predominantly but not entirely in the 1,2 configuration; 1,2-polybutadiene having up to about 94 percent of its units in the 1,2 configuration, the remainder being in the 1,4 configuration, are available and are preferred for their high content of pendant vinyl groups. Units which are incorporated into the polymer in the 1,4 configuration introduce unsaturated bonds into the polymer backbone and do not contribute pendant vinyl groups.

Other predominantly hydrocarbon polymers having pendant vinyl groups may be used as coupling agents in accordance with this invention, such as 3,4-polyisoprene. An example of such a polymer is polyisoprene prepared by free radical polymerization at temperatures on the order of −20° to 120° C. in which up to 5 to 6 percent of the isoprene units can be in the 1,2 configuration, providing pendant vinyl groups, and 5 to 6 percent can be in the 3,4 configuration, providing pendant isopropenyl groups. The predominant configuration in such polyisoprene is the 1,4 configuration which provides unsaturation in the polymer backbone rather than in pendant groups.

The above described coupling agents are employed in practice of this invention in combination with an elastomer gum which can be cured to the solid, elastomeric state with a free radical initiator such as an organic peroxide. Examplary free radical curable elastomers include natural rubber and synthetic rubbers such as polyisoprene, styrene-butadiene rubber, neoprene, nitrile rubber, silicone rubber, 1,4-polybutadiene, acrylate rubbers, ethylene propylene copolymers, ethylene propylene diene terpolymers, and the like.

The utility of the described coupling agents has been demonstrated in practice of this invention in curable compositions including peroxide curable fluoroelastomers. These fluororelastomers are highly fluorinated, containing up to 50 weight percent or more of fluorine, and are highly resistant to solvents, corrosion, compression set, and extremes of temperature. They commonly have molecular weights on the order of 100,000 to 1,000,000. Such fluoroelastomers are commercially available and are finding increasing application where high performance seals, gaskets, rolls, and the like are required. Examplary of these are the Fluorel fluoroelastomers of the 3M Company and the Viton fluoroelastomers of E. I. DuPont de Nemours & Co. (Inc.). Another example is the "KEL-F" Brand series of elastomers available from 3M. It is quite surprising that the hydrocarbon coupling agents are compatible with these highly fluorinated elastomers.

The fluoroelastomers include copolymers of chlorotrifluoroethylene and vinylidene fluoride, polymers of 1,1-dihydroperfluoroalkyl acrylates such as 1,1-dihydroxerfluorobutyl acrylate, and copolymers of vinylidene fluoride and hexafluoropropylene. The Viton and Fluorel fluoroelastomers are of the latter type.

Fluoroelastomers can be produced by emulsion polymerization of ethylenically unsaturated fluorinated monomers in a process analogous to that employed for production of styrene-butadiene rubbers. In addition to the predominant monomer or monomers, for example vinylidene fluoride and hexafluoropropylene, other monomers such as tetrafluoroethylene, perfluoroalkyl vinyl ethers, trifluoroethylene, chlorotrifluorethylene, and perfluorobutene may be incorporated by copolymerization. In the polymerization, deionized, deoxygenated water is used as the dispersion medium. Emulsifiers are fluorocarbon soaps, notably perfluorocarboxylic acids. The pH is maintained with a buffer within a range of about 2 to 11, typically near the neutral point. Free radical initiators such as sodium, potassium, or ammonium persulfate are employed, commonly in conjunction with an accelerator such as a variable valence metal salt, e.g., ferrous sulfate or ferrous nitrate, or a reductant such as sodium bisulfite or potassium metabisulfite. The molecular weight and molecular weight distribution of the product can be controlled with a polymerization regulator such as carbon tetrachloride, methanol, acetone, diethyl malonate, and dodecyl mercaptan.

The polymerization can be carried out on a continuous basis, commonly at elevated pressures of about 100 to 900 psi and temperatures of about 50° C. to 130° C. A stable latex having as much as 50 percent solids can be obtained. More commonly, reaction conditions are regulated to provide a latex of about 25 percent solids. The latex is then coagulated with a salt, an acid, or both, and is washed, dewatered and dried.

Such fluoroelastomers and methods of making them are described in U.S. Pat. Nos. 2,968,649, 3,051,677, 3,053,818, 3,069,401, 3,080,347, 3,707,529, and 3,845,024, which are incorporated herein by this reference.

The fluoroelastomers have saturated backbones, but under curing conditions they undergo dehydrofluorination at vinylidene fluoride units to produce unsaturated bonds that provide sites for curing reactions. Fluoroelastomer compounds generally include a basic metal oxide such as magnesium oxide, zinc oxide, or calcium hydroxide to capture the HF released by dehydrofluorination. These fluoroelastomers can be cured with high energy radiation, peroxides, amines, and phenols. Amine curatives include triethylenetetramine, hexamethylenediamine, hexamethylenediamine carbonate, ethylenediamine carbonate, dicinnamal 1,6-hexanediamine, and disalicylal propylenediamine. Phenol-type cure systems include an accelerator such as a quaternary ammonium hydroxide or salt to a quaternary phosphonium salt, e.g., triphenylbenzyl phosphonium chloride, in combination with a phenol crosslinking agent such as hydroquinone or hexafluoroisopropylidene diphenol. The use of radiation, peroxides, and amine for curing fluoroelastomers has been described in U.S. Pat. Nos. 2,833,752, 3,029,227, 2,951,832, 3,096,314, and 3,403,127, which are incorporated herein by this reference. The incorporation of cure systems into fluoroelastomers has been described in U.S. Pat. Nos. 3,655,727, 3,712,877, 3,752,787, 3,857,807, 3,864,298, and 3,920,620 which are incorporated herein by this reference.

Some commercial fluoroelastomers are supplied with amine or phenol-type curatives already incorporated. Such curative-containing fluoroelastomers can be used in practice of this invention provided a suitable peroxide cure initiator is included for forming cross-links between the coupling agent and the fluoroelastomer matrix.

Another class of commercially available fluoroelastomers useful in practice of this invention are polysiloxanes having both methyl or vinyl substituents and fluorinated alkyl substituents such as 3,3,3-trifluoropropyl substituents. An example of such a fluoroelastomer is Fluorosilicone LS-53 from Dow Corning.

Any solid, particulate filler known in the art for reinforcing elastomers can be used in the present invention, including carbon black, coal fines such as ground coal, carbon fibers, fumed silica, precipitated silica, calcium silicate, zinc oxide, precipitated calcium carbonates, hard clays, alumina, magnesium oxide, magnesium oxide fibers, wollastonite, titanium dioxide, and calcium fluoride. Carbonaceous fillers are preferred for high performance and compatability with all elastomers including the fluoroelastomers. Examples of useful carbonaceous fillers include channel blacks, furnace blacks, lampblacks, thermal blacks, acetylene blacks, ground coal, and fibrous carbon such as graphite fibers or carbon wool. Blacks having relatively large particle sizes, on the order of 180 millimicrons, such as thermal blacks and ground coal, are preferred for use in fluoroelastomers because blacks of very small particle size tend to make curable fluoroelastomer compositions too stiff for easy processing.

Organic peroxide and hydroperoxide cure initiators known in the art for curing elastomers can be used in compositions of this invention. Such initiators include aliphatic and aromatic acyl peroxides and hydroperoxides and aliphatic and aromatic substituted aliphatic peroxides and hydroperoxides. Specific examples of useful organic peroxides are acetyl peroxide, benzoyl peroxide, 2,4-dichlorobenzoyl peroxide, benzoyl hydroperoxide, and t-butyl perbenzoate, t-butyl peroxide, dicumyl peroxide, t-butyl hydroperoxide, and t-butyl cumyl peroxide. Mixtures of such initiators may be used.

Cross-linking of the polymeric coupling agent to the elastomer matrix proceeds efficiently at temperatures above about 300° F., the pendant vinyl groups of the coupling agent being less reactive at lower temperatures. Accordingly, the compositions preferably contain at least one peroxide that becomes active; i.e., that begins to decompose and to generate free radicals, at temperatures above about 300° F., e.g., temperatures in the range of from about 300° F. to 350° F. Such peroxides include, in order of decreasing preference, 2,5-di(t-butylperoxy)-2,5-dimethylhexyne-3, 2,5-di(t-butylperoxy)-2,5-dimethylhexane, and dicumyl peroxide.

Curable compositions of this invention can be prepared by mixing together a curable elastomer gum, a filler, a coupling agent and a peroxide curative on a suitable roll mill or in a Banbury mixer. However, as much as 50 percent more benefit is obtained from a given weight of coupling agent when it is first mixed with or coated onto the filler and the coated filler is then mixed with the elastomer gum and the curative.

Liquid coupling agents of relatively low viscosity can be mixed directly with the filler in a tumbling mixer or ball mill, for example. To achieve more uniform distribution of coupling agent, the coating operation may be conducted at moderately elevated temperatures, on the order of 100° to 200° F., to lower the viscosity of the coupling agent.

A coating method that is useful for all the coupling agents, and particularly for coupling agents of higher molecular weight which are too viscous to coat readily onto the filler particles, is to dissolve or disperse the coupling agent and the filler in an inert, volatile solvent. The solvent is then removed, leaving the coupling agent as a coating on the filler particles. The solvent can be a hydrocarbon such as hexane, benzene, or toluene; an alcohol such as methanol or ethanol; a ketone such as acetone or methyl ethyl ketone; and ester such as ethyl acetate; and the like. When the filler is carbon black, aliphatic solvents are preferred because they are easier than aromatic solvents to remove from the carbon black. It is desirable to include a minor proportion, 0.01 to 0.1% w/w, of an antioxidant such as a hindered phenol antioxidant in the resin to prevent oxidation and hardening of the resin during drying of the coated filler.

The coupling agent is coated on the filler particles in a proportion in the range of from about 5 to 40 percent, e.g., 10 to 30 percent, by weight of filler. Coupling agent is coated on the filler in a proportion sufficient to provide improvement in at least one property of a cured elastomer in which the coated filler is included, but insufficient to cause undesirable agglomeration of the filler. A small degree of agglomeration is acceptable, the test being whether the coated filler can be dispersed effectively in the curable composition. Excessive agglomeration can make good dispersion of the filler difficult to attain.

On the basis of parts by weight per hundred parts of elastomer gum (phr), compositions of this invention include (a) from about 5 to 60 parts, e.g., 25 to 50 parts of coated particulate filler, the coated filler including from about 5 to 40 percent, e.g., 10 to 30 percent, by weight of uncoated filler, of an above described hydrocarbon resin coupling agent having pendant vinyl groups; and (b) from about 0.1 to 5 parts, e.g., 1 to 3 parts, of a peroxide cure initiator effective to cross-link pendant vinyl groups of the coupling agent with the elastomer gum. When the elastomer is a fluoroelastomer that undergoes dehydrofluorination during cure, the compositions also comprise up to about 12 parts, e.g., 3 to 10 parts, of a basic metal oxide or hydroxide.

The curable compositions may also include the usual pigments, plasticizers, oil extenders, antioxidants and the like commonly employed in rubber compounding. Because of the high stability of fluoroelastomers, antioxidants are not needed. Compositions including fluoroelastomer gums can be plasticized with a low molecular weight fluorocarbon polymer, desirably one having the same structure as the gum.

The following examples illustrate embodiments of the present invention. A number of tests were employed in evaluating cured compounds of this invention. Swelling was measured as percent equilibrium swelling in ethyl acetate at 100° F. Hot tear was measured in accordance with ASTM D624 Die B (nicked Crescent tear) using samples equilibrated for ten minutes at 300° F. before testing. R.T. tear was measured at room temperature, 75° F. The modulus, $M_{100}$, is the loading on a standard test specimen at 100 percent elongation, expressed as pounds per square inch of unstressed cross-section. Tensile strength, $T_B$, is the loading of the standard test specimens at the breaking point, expressed as pounds per square inch of unstressed cross-section. Elongation, $E_B$, is the length of a segment of the standard test specimen at the breaking point, expressed as a percentage of the unstressed length of the segment, Standard Shore A hardnesses are also reported.

Creep is a measure of the gradual elongation of a standard ASTM D 1329 test specimen immersed in water at ambient temperature, about 75° F., under a constant stress of about 100 pounds per square inch of unstressed cross-section. A specimen to be tested is immersed in water and subjected to stress by means of a weight and pulley arrangement. The initial length, $L_o$, of a selected segment is measured. After an elapsed time of immersion, e.g., 24 hours or 1000 minutes (16.67 hours), the final length, L, of the segment is measured. Creep is reported as a percentage of $L_o$: $100 \times (L - L_o)/L_o$. Unless otherwise noted, the time of immersion in the following examples was 1000 minutes.

EXAMPLE 1

A carbon black filler coated with 20% w/w, i.e., 20% by weight of coated carbon black, of a nominal 3000 molecular weight, hydroxy-terminated 1,2-polybutadiene resin, was prepared by ball milling medium thermal carbon black (average particle size 250 millimicrons) with the resin in acetone slurry and drying the coated black at 150° F. to remove the acetone.

EXAMPLE 2

A carbon black filler coated with 20% w/w of a nominal 3000 molecular weight hydroxy-terminated 1,2-polybutadiene resin was prepared by heating medium thermal carbon black with the resin in a proportion of 25% by weight of uncoated carbon black in toluene slurry in the presence of trifluoroacetic anhydride, and drying the coated carbon black at 150° F.

EXAMPLE 3

To 1200 grams of Vanderbilt's P-33 carbon black was added a mixture of 4550 milliliters of distilled water, 921 milliliters of concentrated sulfuric acid and 700 grams of sodium dichromate. The slurry was refluxed for two hours and filtered. The filter cake of oxidized carbon black was washed twice with hot distilled water and dried in vacuum. The slurry pH of the P-33 black was 9.0; slurry pH of the oxidized black was 2.9 to 3.8, depending on the batch. This treatment was expected to create sites on the particles for esterification with a hydroxy-terminated 1,2-polybutadiene.

A slurry of 1000 grams of oxidized carbon black and 250 grams of a nominal 1000 molecular weight, hydroxy-terminated 1,2-polybutadiene resin containing 0.02% w/w hindered phenol antioxidant in one liter of acetone was stirred for two hours at ambient temperature. Fifty milliliters of distilled water was added to the slurry, causing the coated black to accumulate near the bottom of the vessel. Stirring was continued for one-half hour, an additional liter of distilled water was added, and after several minutes the stirring was stopped. The coated carbon black was filtered and vacuum dried at 150° F. The resulting cake was ground with a mortar and pestle to a dry, free-flowing powder.

EXAMPLE 4

Oxidized P-33 carbon black was slurried in toluene with a nominal 3000 molecular weight, hydroxy-terminated 1,2-polybutadiene resin in a proportion of 25% by weight of carbon black, in the presence of two mole equivalents of acetic anhydride. After standing overnight at room temperature, the solvent was decanted, and the carbon black was washed with water, dilute sodium bicarbonate, and water and was dried. The dried carbon black was slurried in acetone, the solvent was decanted, and the carbon black was dried. The resulting coated carbon black was dry and free-flowing.

The coated filler was analyzed by thermogravimetric analysis (TGA) and then by solvent extraction to determine the amount of resin bonded to the filler. Weight loss on TGA was 28.0% assumed to represent total resin. Soxhlet extraction of the coated filler with toluene resulted in a weight loss of 15.4%; assumed to be non-bonded resin. The difference, 12.6% w/w, is taken as the amount of resin bonded to the carbon black particles.

EXAMPLE 5

Austin Black, a −325 mesh ground coal dust from Slab Fork Coal Co., was coated with a nominal 1000 molecular weight hydroxy-terminated 1,2-polybutadiene resin as follows:

A slurry of 40 grams of the 1,2-polybutadiene resin, 0.01 gram of a hindered phenol antioxidant (to protect the resin from oxidation during drying), and 200 grams of Austin Black in 500 milliliters of acetone was stirred for two hours. Fifty milliliters of distilled water was added and stirring was continued for one-half hour. A liter of water was then added and the slurry was filtered. The filter cake was broken up and dried at 150° F., and the product was ground by mortar and pestle to a dry, free-flowing powder.

EXAMPLE 6

The three fluoroelastomer compounds shown in Table 1 were prepared by mixing the listed ingredients and mold curing the mixtures as shown in the Table. All amounts are parts by weight.

TABLE 1

| | COMPOUND | | |
|---|---|---|---|
| | 1 | 2 | 3 |
| Component | | | |
| Viton A-HV[1] | 100.0 | 100.0 | 100.0 |
| MgO | 5.0 | 5.0 | 5.0 |
| P-33 Black[2] | 30.0 | — | — |
| Resin A[3] | 5.0 | — | — |
| P-33 + Resin A[4] | — | 30.0 + 5.0 | — |
| P-33 + Resin B[5] | — | — | 30.0 + 5.0 |
| Benzoyl Peroxide | 5.0 | 5.0 | 5.0 |
| Cure, 15 Min at 260° F. | | | |
| Postcure, 18 Hours at 450° F. | | | |
| Properties | | | |
| Swelling, % | 608 | 418 | 287 |

TABLE 1-continued

|  | COMPOUND | | |
|---|---|---|---|
|  | 1 | 2 | 3 |
| Creep, %, 24 hours | 24 | 16.5 | 6.0 |

[1] High viscosity fluoroelastomer from DuPont, peroxide curable at relatively low temperature, e.g., 260° F.
[2] Fine thermal carbon black from Vanderbilt; average particle size about 180 millimicrons.
[3] A 1,2-polybutadiene having a nominal molecular weight of about 3000 and being about 94 percent in the 1,2 configuration.
[4] Carbon black coated with Resin A before mixing with the fluoroelastomer.
[5] Carbon black coated with Resin B, a hydroxy-terminated, 1,2-polybutadiene having a nominal molecular weight of 3000 in the presence of dicumyl peroxide.

Compounds 2 and 3, in which the carbon black was precoated with 1,2-polybutadiene resin before incorporation into the elastomer, both show less swelling and creep than compound 1.

EXAMPLE 7

Two fluoroelastomer compositions shown in Table 2 below were prepared using coated carbon blacks prepared as described in Examples 1 and 2.

TABLE 2

|  | COMPOUND | |
|---|---|---|
|  | 4 | 5 |
| Component |  |  |
| Viton VT-R-4590 | 100 | 100 |
| Ca(OH)$_2$ | 3 | 3 |
| TAIC[1] | 2 | 2 |
| Carbon Black A[2] | 20 | — |
| Carbon Black B[3] | — | 20 |
| Peroxide[4] | 0.8 | 0.8 |
| Cure - 20 minutes at 350° F. |  |  |
| Postcure - 16 hours at 450° F. |  |  |
| Properties |  |  |
| Creep, % | 8 | 3 |
| Swelling, % | 137 | 123 |
| Hot Tear, pli | 38 | 44 |
| $M_{100}$, psi | 1135 | 1250 |
| $T_B$, psi | 2535 | 2150 |
| $E_B$, % | 190 | 170 |
| Shore A | 90 | 92 |

[1] Triallylisocyanurate, a cross-linking agent.
[2] Prepared as described in Example 1.
[3] Prepared as described in Example 2.
[4] 2,5-di(t-butylperoxy)-2,5-dimethylhexane Both compounds show excellent creep, an indication of coupling between the carbon black and the fluoroelastomer. Compound 5 has better creep, swelling and hot tear than Compound 4, all of which are believed to reflect more effective coupling in Compound 5.

EXAMPLE 8

Oxidized carbon blacks coated with 0, 5.6, 10.0, and 20% by weight of coated filler of a nominal 1000 molecular weight, hydroxy-terminated 1,2-polybutadiene were prepared in accordance with the procedure of Example 3. Five fluoroelastomer compounds, each containing 30 parts of carbon black (uncoated basis) were prepared according to the following schedule:

In a water-cooled Banbury No. 00 mixer at volume loadings of 293 cubic centimeters:

| Time, minutes | Action |
|---|---|
| 0 | Charge fluorelastomer gum |
| 0.5 | Add fillers and chemicals except curatives |
| 3.5 | Dump mix |

On a six-inch water cooled roll mill, add curatives and mix for three minutes with frequent cross cuts. Cure samples in cavity molds.

Table 3 shows the compounds and their properties.

TABLE 3

|  | COMPOUND | | | | |
|---|---|---|---|---|---|
|  | 6 | 7 | 8 | 9 | 10 |
| Component |  |  |  |  |  |
| Viton VT-4590 | 100.0 | 100.0 | 100.0 | 100.0 | 100.0 |
| Ca(OH)$_2$ | 3.0 | 3.0 | 3.0 | 3.0 | 3.0 |
| TAIC | 2.0 | 2.0 | 2.0 | 2.0 | 2.0 |
| Peroxide[1] | 0.8 | 0.8 | 0.8 | 0.8 | 0.8 |
| Carbon Black[2] | A = 30.0 | B = 31.5 | C = 33.0 | D = 36.0 | A = 30.0 |
| Resin[3] | — | — | — | — | 6.0 |
| Mold Cure: 20 minutes at 350° F. |  |  |  |  |  |
| Post Cure: 16 hours at 450° F. |  |  |  |  |  |
| Properties |  |  |  |  |  |
| Creep, % | 9.8 | 5.6 | 4.9 | 2.1 | 6.2 |
| Swelling, % | 152 | 135 | 128 | 97 | 125 |
| Hot Tear, pli | 21 | 25 | 28 | 49 | 32 |
| R.T. Tear, pli | 195 | 110 | 215 | 270 | 200 |
| $M_{100}$, psi | 1470 | 1765 | 1350 | 1890 | 1600 |
| $T_B$, psi | 2960 | 2065 | 1520 | 2070 | 2095 |
| $E_B$, psi | 165 | 120 | 115 | 120 | 140 |
| Shore A | 86 | 88 | 90 | 98 | 92 |

[1] 2,5-di(t-butylperoxy)-2,5-dimethylhexane
[2] A = Oxidized P-33
B = Oxidized P-33 w/5.6% w/w resin[3]
C = Oxidized P-33 w/10.0% w/w resin[3]
D = Oxidized P-33 w/20% w/w resin[3]
[3] A nominal 1000 molecular weight, hydroxy-terminated 1,2-polybutadiene.

EXAMPLE 9

The following fluoroelastomer compounds include coated thermal black and coated Austin Black fillers. Blends of the different blacks can be used to achieve a desired balance of high tensile strength, which is favored by the thermal black, and low compression set, which is favored by the Austin Black. Compound 11 is a control.

TABLE 4

| | COMPOUND | | | |
|---|---|---|---|---|
| | 11 | 12 | 13 | 14 |
| Component | | | | |
| LD-4283 (Viton GLT)[1] | 100.0 | 100.0 | 100.0 | 100.0 |
| Ca(OH)$_2$ | 4.0 | 3.0 | 3.0 | 3.0 |
| TAIC | 4.0 | — | — | — |
| Peroxide[2] | 2.0 | 1.5 | 1.5 | 1.5 |
| Austin Black | 20.0 | — | — | — |
| Thermal black | 10.0 | — | — | 30.0 |
| Coated Austin Black[3] | — | 24.0 | — | — |
| Coated Thermal black[3] | — | 12.0 | 36.0 | — |
| Resin[4] | — | — | — | 6.0 |
| Cure: 20 minutes at 350° F. | | | | |
| Postcure: 16 hours at 450° F. | | | | |
| Properties | | | | |
| $M_{100}$, psi | 1200 | 1025 | 805 | 600 |
| $T_B$, psi | 1975 | 1775 | 2200 | 1900 |
| $E_B$, % | 165 | 195 | 270 | 370 |
| Shore A | 77 | 83 | 83 | 81 |
| R.T. Tear, pli | 85 | 125 | 140 | 160 |
| Hot Tear, pli | 13 | 41 | 53 | 63 |
| Creep, % | 14 | 9 | 13 | 17 |

[1]Peroxide curable fluoroelastomer from DuPont.
[2]2,5-di(t-butylperoxy)-2,5-dimethylhexane.
[3]Coated with 20% w/w of resin[4].
[4]A nominal 1000 molecular weight, hydroxy-terminated 1,2-polybutadiene resin.

EXAMPLE 10

The following compounds were prepared to evaluate the use of Austin Black in fluoroelastomer compounds of this invention. Compounds 15 and 16 are controls.

TABLE 5

| | COMPOUND | | | | | |
|---|---|---|---|---|---|---|
| | 15 | 16 | 17 | 18 | 19 | 20 |
| Component | | | | | | |
| LD-4283 (Viton GLT) | 100.0 | 100.0 | 100.0 | 100.0 | 100.0 | 100.0 |
| Ca(OH)$_2$ | 3.0 | 3.0 | 3.0 | 3.0 | 3.0 | 3.0 |
| Peroxide[1] | 1.0 | 1.0 | 1.0 | 1.0 | 1.0 | 1.0 |
| Austin Black | — | 30.0 | — | — | — | 13 |
| Coated Austin Black[2] | — | — | 12.0 | 24.0 | 36.0 | 12.0 |
| Coated Oxidated P-33[2] | — | — | — | — | — | 24.0 |
| Cure: 20 minutes at 350° F. | | | | | | |
| Postcure: 16 hours at 450° F. | | | | | | |
| Properties | | | | | | |
| Swelling, % | 1000 | 409 | 554 | 310 | 202 | 262 |
| Creep, % | 130 | 34.7 | 79.5 | 29.5 | 8.8 | 5.8 |
| Hot Tear, 300° F., pli | 30 | 64 | 49 | 55 | 98 | 100 |

[1]2,5-di(t-butylperoxy)-2,5-dimethylhexane
[2]Coated with 20% w/w of a nominal 1000 molecular weight, hydroxy-terminated 1,2-polybutadiene resin.

Compound 20, which includes both Austin Black and thermal black has the lowest creep and highest tear strength. Austin Black is a preferred filler for seal materials because it gives compounds having low compression set.

Particulate fillers coated with hydrocarbon resin having pendant vinyl groups in accordance with this invention are also useful in curable elastomer compositions which include curatives such as sulfur, bisphenols, or diamines but which do not include organic peroxide curatives. In such systems, it is believed that the resin can improve the dispersion of the filler, affecting properties which reflect improved dispersion, such as modulus and elongation at break, whether the resin functions as a true coupling agent or not.

EXAMPLE 11

The fluoroelastomer compounds in Table 6 below employ bisphenol (compounds 21 and 22) and diamine (compounds 23 and 24) cure systems. Compounds containing coated and uncoated carbon blacks are compared. The processing characteristic "Kw at 3½ Min Dump" refers to the power consumption of the Banbury mixer. Lower power consumption may reflect easier dispersability of the coated carbon black.

TABLE 6

| | COMPOUND | | | |
|---|---|---|---|---|
| | 21 | 22 | 23 | 24 |
| Component | | | | |
| Viton E-60C[1] | 100.0 | 100.0 | — | — |
| Viton B[2] | — | — | 100.0 | 100.0 |
| Oxidized P-33 | 30.0 | — | 30.0 | — |
| Coated Ox. P-33[3] | — | 36.0 | — | 36.0 |
| MgO | 3.0 | 3.0 | 15.0 | 15.0 |
| Ca(OH)$_2$ | 6.0 | 6.0 | — | — |
| Diak No. 3[4] | — | — | 3.0 | 3.0 |
| Processing | | | | |
| Kw at 3½ Min. Dump | 3.1 | 2.7 | 3.0 | 2.1 |
| Cure - Min/°F. | 10/350 | 10/350 | 30/300 | 30/300 |
| Posture - Hrs/°F. | 16/450 | 16/450 | 24/400 | 24/400 |
| Properties | | | | |
| $M_{100}$, psi | 950 | 1390 | 875 | 1520 |
| $T_B$, psi | 1155 | 1655 | 2400 | 2740 |
| $E_B$, % | 210 | 140 | 330 | 180 |
| Shore A | 83 | 87 | 83 | 89 |
| R.T. Tear, pli | 140 | 135 | 145 | 115 |
| Swell, % | 218 | 199 | 256 | 190 |
| Creep, % | 13.5 | 7.8 | 15.5 | 12.0 |
| Hot Tear, pli | 36 | 40 | 44 | 39 |

[1]DuPont fluoroelastomer containing bisphenol curative.
[2]Amine curable DuPont fluoroelastomer
[3]Oxidized carbon black coated with a nominal 1000 molecular weight, hydroxy-terminated 1,2-polybutadiene resin in a proportion of 20% by weight of coated carbon black.
[4]A diamine curative.

Comparing Compounds 21 and 22, use of coated filler raised the modulus, tensile strength, and hardness of the cured compound and lowered swelling and creep. Similar effects are seen in comparing Compounds 23 and 24. Thus, coated fillers of this invention are useful in non-peroxide cure systems.

Curable compositions of this invention can be cured by any method used in the art for curing of filled elastomer compounds such as mold curing, autoclaving, hot air vulcanization, etc. Curing conditions vary widely, depending upon the curable composition and the article being made. It is desirable to use a postcure of at least about 5 hours, preferably at least about 10 hours, at temperatures above about 400° F. to develop optimum properties in the cured article.

As used herein, the term "vulcanizate" designates compositions of the present invention that have been cured with organic peroxides as described herein; it is not intended to suggest the presence or use of sulfur as a curative.

The invention has been described herein with reference to particular details and embodiments thereof which are intended to illustrate the invention. One skilled in the art will recognize that many variations in proportions, curing conditions, optional additives, and the like may be made within the scope of the following claims.

I claim:

1. A method for providing a curable composition which comprises:
    (A) coating a solid, particulate carbonaceous filler with a low viscosity hydrocarbon resin coupling agent having a plurality of pendant vinyl groups per molecule contained in a solvent, and evaporating the solvent to form the coated solid, carbonaceous particulate filler;
    (B) blending the coated solid, carbonaceous particulate filler with a fluoroelastomer gum capable of curing to a solid elastomeric state in the presence of an organic free radical peroxide initiator and an organic free radical peroxide initiator capable of effecting reaction between said fluoroelastomer gum and the pendant vinyl groups of the coupling agent.

2. A method as claimed in claim 1 in which the carbonaceous filler is selected from the group consisting of carbon black, oxidized carbon black, thermal black and ground coal.

3. A method as claimed in claim 1 in which the fluoroelastomer gum is selected from the group consisting of copolymers of chlorotrifluoroethylene and vinylidene fluoride, polymers of 1,1-dihydroperfluoroalkyl acrylates, and copolymers of vinylidene fluoride and hexafluoropropylene.

4. A method as claimed in claim 1 in which the coupling agent has an average molecular weight in the range from 300 to 700.

5. A method as claimed in claim 1 in which the coupling agent has an average molecular weight of from 1000 to 5000.

6. A method as claimed in claim 1 in which the coupling agent is a 1,2-polybutadiene.

7. A method as claimed in claim 1 in which the coupling agent is a 3,4-polyisoprene.

8. A method as claimed in claim 1 in which the organic free radical peroxide initiator is selected from the group cosnisting of 2,5-di(t-butylperoxy)-2,5-dimethylhexyne-3,2,5-di(t-butylperoxy)-2,5-dimethylhexane, and dicumyl peroxide.

* * * * *

UNITED STATES PATENT AND TRADEMARK OFFICE
CERTIFICATE OF CORRECTION

PATENT NO. : 4,251,432

DATED : February 17, 1981

INVENTOR(S) : Jon W. Martin

It is certified that error appears in the above-identified patent and that said Letters Patent are hereby corrected as shown below:

Column 10, Table 3, Line 42, "Viton VT-4590" should be -- Viton VT-R-4590 --. Column 11, Table 5, Line 43, "13" should be -- -- --. Column 11, Table 5, Line 45, "Oxidated" should be -- Oxidized --.

Signed and Sealed this

Eighth Day of November 1983

[SEAL]

Attest:

GERALD J. MOSSINGHOFF

Attesting Officer

Commissioner of Patents and Trademarks